United States Patent [19]
Bubeck et al.

[11] Patent Number: 4,874,815
[45] Date of Patent: Oct. 17, 1989

[54] ABS COMPOSITIONS HAVING TRIMODAL RUBBER PARTICLE DISTRIBUTIONS

[75] Inventors: Robert A. Bubeck; Robert B. Clipper; David E. Henton, all of Midland, Mich.

[73] Assignee: The Dow Chemical Company, Midland, Mich.

[21] Appl. No.: 96,247

[22] Filed: Sep. 8, 1987

Related U.S. Application Data

[63] Continuation of Ser. No. 697,379, Feb. 1, 1985, abandoned.

[51] Int. Cl.$^4$ ............................................. C08L 51/04
[52] U.S. Cl. ...................................... 525/71; 525/84; 525/85; 525/86
[58] Field of Search ............................................. 525/71

[56] References Cited

U.S. PATENT DOCUMENTS

| | | |
|---|---|---|
| 3,652,721 | 3/1972 | Dalton et al. ............................ 525/68 |
| 3,903,200 | 9/1975 | Cincera et al. . |
| 4,012,462 | 3/1977 | Chaudhary . |
| 4,277,574 | 7/1981 | Jastrzebski et al. . |
| 4,430,478 | 2/1984 | Schmitt et al. . |

Primary Examiner—Jacob Ziegler
Attorney, Agent, or Firm—Douglas N. Deline

[57] ABSTRACT

A rubber modified interpolymer of a monovinylidene aromatic monomer and an ethylenically unsaturated nitrile monomer. The rubber particles of the present invention have a trimodal particle size distribution. Said particles comprise an emulsion polymerized particle and two mass polymerized particles. The compositions exhibit good impact resistance over a broad range of impact speeds.

10 Claims, No Drawings

ABS COMPOSITIONS HAVING TRIMODAL RUBBER PARTICLE DISTRIBUTIONS

CROSS-REFERENCE TO RELATED APPLICATION

This is a continuation of application Ser. No. 697,379 filed Feb. 1, 1985, now abandoned.

BACKGROUND OF THE INVENTION

This invention relates to an ABS or ABS-type composition, particularly, it relates to an ABS or ABS-type composition having a trimodal rubber particle size distribution.

It is well-known in the art that impact resistant polymer compositions can be prepared by incorporating therein various elastomeric (rubber) materials.

One such impact resistant composition is a terpolymer of acrylonitrile/butadiene/styrene (ABS). ABS or ABS-type compositions normally comprise a combination of elastomer (e.g., polybutadiene) with a rigid interpolymer of monovinylidene aromatic monomer and an ethylenically unsaturated nitrile monomer. ABS or ABS-type compositions usually consist of a rigid matrix as a continuous phase having dispersed therein particles of the elastomer. The elastomeric particles usually have grafted thereto amounts of the rigid interpolymers or a similar inter- or homopolymer.

The physical properties of ABS or ABS-type interpolymers are greatly affected by the concentration, size, and structure of the elastomeric particles contained therein. Particles $0.5\mu$ in diameter or larger contribute greatly to impact strength and reduce the gloss of the composition. Particles smaller than about $0.5\mu$ in diameter result in glossier compositions, said glossy compositions having less impact strength than those compositions in which larger particles ($0.5\mu$ in diameter or greater) are used in similar amounts.

Similarly, the structure of the individual elastomeric particles affects the physical properties of the ABS or ABS-type interpolymers. There are, generally, two main structure types of elastomeric particles.

One of the two main types is a grafted rubber particle containing occlusions of matrix polymer therein. Rubber particles with this structure are usually formed and grafted in a mass, mass-type, mass-suspension-type, or mass-solution-type, polymerization process wherein phase inversion occurs. These processes normally involve dissolving a previously-produced rubber in an amount of polymerizable monomer or in a mixture or solution of polymerizable monomer(s) with optional diluents, which monomer(s) are then polymerized under agitation. These grafted, occlusion containing rubber particles prepared by a mass, mass-solution-type, mass-suspension-type, or mass-type process will hereinafter be referred to as "mass polymerized particles". The mass polymerized particles impart impact resistance to ABS or ABS-type compositions. Detrimentally, the mass polymerized particles lower the gloss of the interpolymer in which they are contained.

The other main rubber particle structure type is a generally solid rubber particle. Rubber particles with this structure are usually formed and grafted through an emulsion polymerization process. The emulsion polymerization process generally involves emulsion polymerization of a rubber in an aqueous latex, then adding polymerizable and graftable monomers to the rubber-containing latex and polymerizing said monomers to form the graft portion and all or part of the desired matrix polymer. These generally solid rubber particles will hereinafter be referred to as "emulsion polymerized particles." An interpolymer containing emulsion polymerized particles will generally exhibit less impact resistance than an interpolymer containing an equal amount of rubber in the form of mass polymerized particles.

It is desirable to produce an interpolymer possessing good impact resistance. In an attempt to produce such a composition much work has been done in the area of tailoring the size, structure, and concentration of the rubber particles. Representative Patents include U.S. Pat. Nos. 3,903,200; 4,012,462; 4,277,574; and 4,430,478.

U.S. Pat. No. 3,903,200 teaches a polymeric composition having dispersed therein rubber particles having a bimodal size distribution. One set of particles is produced in a mass-polymerization process and has an average particle size of 0.7 to 10 microns. The other set of particles is produced in an emulsion polymerization process and has an average particle size of 0.01 to 0.5 microns.

U.S. Pat. No. 4,012,462 teaches a method of producing a rubber modified polymeric composition wherein the rubber particles have a broad particle size distribution.

U.S. Pat. No. 4,277,574 teaches a method of producing a rubber modified polymeric composition. The rubber modifying particles are produced in a mass process and have a bimodal particle size distribution.

U.S. Pat. No. 4,430,478 teaches a polymeric composition having dispersed therein rubber particles having a trimodal particle size distribution. One set of particles is produced in a mass-polymerization process and has a diameter of from 0.5 to 5.0 microns. The second set of particles is produced in an emulsion polymerization process and has a diameter of from 0.05 to 0.18 microns. The third set of particles is produced in an emulsion polymerization process and has a diameter of from 0.25 to 0.6 microns.

The prior art recognized that the presence of a large mass polymerized particle improved the impact resistance of an ABS resin. The prior art measured impact resistance through a Notched Izod or Falling Dart impact test. These tests only measure impact resistance within a narrow range of impact rates.

Impact resistance for a polymeric composition can be determined by impelling a dart into a sample of the composition and measuring the energy needed to break the sample. It has been found that the amount of energy needed to break a sample of a given composition changes as the impact speed of the dart changes. It is therefore possible for a given composition to have better impact resistance when impacted by a dart travelling at a high rate of speed than when impacted by a dart travelling at a low rate of speed. The converse can also be true.

It would be desirable to produce an ABS or ABS-type composition having good impact resistance over a broad range of dart impact speeds. It is to this goal that the present invention is directed.

SUMMARY OF THE INVENTION

The present invention concerns an improved rubber-modified, impact resistant polymeric composition comprising:

(a) a matrix comprising an interpolymer, said interpolymer being polymerized from a monovinylidene aromatic monomer and an ethylenically unsaturated nitrile monomer; and (b) dispersed in said matrix, in the form of discrete particles, from about 6 to about 40 weight percent, based on total polymeric composition weight, of elastomeric material wherein the improvement consists of the dispersed elastomeric material comprising the following three different rubber components:

(1) a component of small emulsion polymerized particles being from about 10 to about 90 weight percent of the total elastomeric material and having a volume average diameter from about 0.05 micron to about 0.25 micron;

(2) a component of small mass polymerized particles being from about 5 to about 85 weight percent of the total elastomeric material, and having a volume average diameter from about 0.5 micron to about 3.0 microns; and (3) a component of large mass polymerized particles being from about 5.0 to about 50 weight percent of the total elastomeric material said large mass polymerized particles having a volume average diameter greater than the volume average diameter of the small mass polymerized particles, said large mass polymerized particles having a volume average diameter of from about 1.0 microns to about 10 microns.

DETAILED DESCRIPTION OF THE INVENTION

The present invention comprises two main elements (a) a generally rigid matrix or continuous phase and (b) an elastomeric (rubber) phase dispersed in said matrix. The elastomeric phase is in particulate form, said particles having a trimodal size distribution.

The matrix or continuous phase of the present invention consists principally of an interpolymer polymerized from a monovinylidene aromatic monomer and an ethylenically unsaturated nitrile monomer. The matrix generally comprises at least about 30 percent by weight, based on total matrix weight, of the interpolymer.

When it is not 100 weight percent monovinylidene aromatic/ethylenically unsaturated nitrile copolymer, the balance of the matrix can comprise (1) comonomers interpolymerized into the monovinylidene aromatic/ethylenically unsaturated nitrile interpolymer, (2) additional non-elastomeric polymeric material, or (3) other filler-type material combined with the monovinylidene aromatic/ethylenically unsaturated nitrile interpolymer.

The molecular weight of the matrix polymer and of the graft polymer grafted to the rubber influences the physical properties of the resultant rubber modified polymeric composition. Higher molecular weights increase the toughness of the composition while reducing its gloss and flow.

The matrix (ungrafted) interpolymer (a) can be produced during the grafting of the emulsion polymerized particles, (b) can be produced during the grafting of the small mass polymerized particles, (c) can be produced during the grafting of the large mass polymerized particles, (d) can be produced separately and combined with the rubber particles, or (e) can be a combination of one or more of these. The weight average molecular weight (Mw) of the matrix (ungrafted) interpolymer, from all of the sources together, should be from about 40,000 to about 300,000. The weight average Mw is preferably from about 70,000 to about 200,000.

Exemplary of the monovinylidene aromatic monomers suitable for use in the claimed invention are styrene; alpha-alkyl monovinylidene monoaromatic compounds (e.g., alpha-methylstyrene, alpha-ethylstyrene, alpha-methylvinyltoluene, alpha-methyl dialkylstyrenes, etc.); ring-substituted alkyl styrenes (e.g., ortho-meta-, and paravinyl toluene; o-ethylstyrene; p-ethylstyrene; 2,4-dimethylstyrene; p-tertiarybutyl styrene; etc.); ring-substituted halostyrenes (e.g., o-chlorostyrene, p-chlorostyrene, o-bromostyrene, 2,4-dichlorostyrene, etc.); ring-alkyl, ring-halosubstituted styrenes (e.g., 2-chloro-4-methylstyrene, 2,6-dichloro-4-methylstyrene, etc.); vinyl naphthalene; vinyl anthracene, etc. The alkyl substituents generally have 1 to 4 carbon atoms and may include isopropyl and isobutyl groups. If desired, mixtures of one or more of such monovinylidene aromatic monomers may be used.

Exemplary of the unsaturated nitrile suitable for use in the claimed invention are acrylonitrile, methacrylonitrile, ethacrylonitrile, and mixtures thereof. The unsaturated nitrile is generally present in the matrix interpolymer in an amount of from about 5 to about 50, preferably, from about 15 to about 35 percent by weight matrix interpolymers.

In addition, to the monovinylidene aromatic monomers and ethylenically unsaturated nitrile monomers other monomers may be polymerized in the interpolymer of the matrix. Other such monomers include alpha-unsaturated monobasic acids and derivatives thereof (e.g., acrylic acid, methyl acrylate, ethyl acrylate, butyl acrylate, 2-ethylhexyl acrylate, methacrylic acid and the corresponding esters thereof such as methyl methacrylate, etc., acrylamide, methacrylamide); vinyl halides such as vinyl chloride, vinyl bromide, etc.; vinylidene chloride, vinylidene bromide, etc.; vinyl esters such as vinyl acetate, vinyl propionate, etc.; dialkyl maleates or fumarates such as dimethyl maleate, diethyl maleate, dibutyl maleate, the corresponding fumarates, etc.

Such additional monomers will generally be present in the interpolymer of the matrix in amounts of less than about 10 weight percent based on total weight of monomers used in forming the interpolymer of the matrix.

It has been found that higher levels of methyl methacrylate can, advantageously, be included in the matrix of the present invention. The methyl methacrylate is polymerized in the matrix in amounts of from about 1 to about 50 weight percent based on the total weight of the interpolymer of the matrix.

It may also be desirable to include in the present ABS or ABS-type compositions amounts of other polymers and/or copolymers such as polymers and/or copolymers of phenylene oxide, polycarbonates, and polyester polycarbonates.

The matrix interpolymer and the polymer grafted to and/or occluded within the rubber particles may have the same or different composition as long as they are compatible. For the purposes of this invention matrix and graft interpolymers are considered compatible if a blend of the interpolymers would displace the glass transition temperature of the matrix interpolymer. Preferentially, a blend of the graft interpolymer with a compatible matrix interpolymer exhibits a single glass transition temperature.

Techniques suitable for producing matrix interpolymer and grafted and/or grafted and occluded interpolymers are well-known in the art. Examples of the known polymerization processes include mass, mass-solution, mass-suspension, suspension and emulsion polymerization processes as well as other modifications and/or combinations of such processes. See, for example, U.S. Pat. Nos. 3,509,237; 3,928,494; 4,221,883; 4,239,863; 4,243,765; and 4,250,271; which are incorporated herein by reference and teach such processes.

As is well-known in the art, the reaction used to graft homo- or interpolymer onto the rubber particles can be used to produce all or part of the matrix interpolymer. In most instances the graft reaction inherently produces at least small amounts of ungrafted interpolymer.

In graft polymerization reactions, as is well-known in the art, the desired polymerizable monomers are combined with the preformed rubber substrate. The monomers are then polymerized to chemically combine or graft at least a portion of the forming polymer on the preformed rubber substrate.

Various elastomeric materials (rubbers) are suitable for use in the present invention. The rubbers include diene rubbers, ethylene propylene rubbers, ethylene propylene diene (EPDM) rubbers, acrylate rubbers, polyisoprene rubbers, halogen-containing rubbers, and mixtures thereof. Also suitable are interpolymers of rubber-forming monomers with other copolymerizable monomers.

The preferred rubbers are diene rubbers or mixtures of diene rubbers. A diene rubber is any rubbery polymer of one or more conjugated 1,3-dienes, e.g., butadiene, isoprene, piperylene, chloroprene, etc.

For the purposes of this invention a "rubbery polymer" is a polymer having a glass transition temperature not higher than 0° C., preferably not higher than −20° C., as determined by ASTM Test D-746-52T. Such rubbery polymers include homopolymers, block copolymers and interpolymers of conjugated 1,3-dienes with up to an equal amount by weight of one or more copolymerizable monoethylenically unsaturated monomers, such as monovinylidene aromatic hydrocarbons (e.g., styrene; a ring-substituted alkylstyrene, such as o-, m-, and p-vinyl toluene, 2,4-dimethylstyrene, the ring-substituted ethylstyrenes, p-tert-butylstyrene, etc.; an alpha-alkylstyrene, such as alpha-methylstyrene, alpha-ethylstyrene, alpha-methyl-p-methylstyrene, etc.; vinyl naphthalene, etc.); ring-substituted halo mono-vinylidene aromatic hydrocarbons (e.g., the o-, m-, and p-chlorostyrenes, 2,4-dibromostyrene, 2-methyl-4-chlorostyrene, etc.); acrylonitrile; methacrylonitrile; alkyl acrylates (e.g., methyl acrylate, butyl acrylate, methacrylates); acrylamides (e.g., acrylamide, methacrylamide, N-butyl acrylamide, etc.); unsaturated ketones (e.g., methyl vinyl ketone, methyl isopropenyl ketone, etc.); alpha-olefins (e.g., ethylene, propylene, etc.); pyridines; vinyl esters (e.g., vinyl acetate, vinyl stearate, etc.); vinyl and vinylidene halides (e.g., the vinyl and vinylidene chlorides and bromides, etc.); and the like.

A preferred group of rubbers for use in the mass polymerized and emulsion polymerized particles are those consisting essentially of 70 to 100 percent by weight of butadiene and/or isoprene and up to 30 percent by weight of one or more of the monomers selected from the group consisting of monovinylidene aromatic hydrocarbons (e.g., styrene) and unsaturated nitriles (e.g., acrylonitrile). Particularly advantageous rubbers for the preparation of the emulsion polymerized particles are butadiene homopolymers or an interpolymer of 90 to 97 percent by weight butadiene and 3 to 10 percent by weight of acrylonitrile and/or styrene.

The emulsion produced rubber may contain up to about 2 percent of a cross-linking agent based on the weight of the rubber-forming monomer or monomers. The cross-linking agent can be any of the agents conventionally used for cross-linking diene rubbers. Suitable examples include divinylbenzene, diallyl maleate, diallyl fumarate, diallyl adipate, allyl acrylate, allyl methacrylate, diacrylates, and dimethyl acrylates of polyhydric alcohols (e.g., ethylene glycol dimethyacrylate, etc.), and the like.

Various techniques are customarily used for polymerizing rubber-forming monomers including Ziegler-Natta, anoonic, and free radical polymerization.

The compositions of the present invention have dispersed therein from about 6 to about 40 weight percent rubber particles, based on total composition weight. Preferably, the rubber particles are present in amounts of from about 10 to about 30 weight percent based on total composition weight.

The essence of the present invention is that the dispersed rubber particles comprise three different components. Each rubber particle component consists of rubber particles of the same rubber particle type and having about the same particle size.

Rubber particle types are (a) the occluded particles usually made in a mass polymerization or mass-type polymerization process and (b) the generally solid (although some small occlusions are possible) particles usually made in an emulsion polymerization process.

For the purposes of this invention the term "mass polymerization or mass-type polymerization process" refers to a process wherein a previously-produced rubber is dissolved in an amount of polymerizable monomer or in a mixture or solution of polymerizable monomers with optional diluents; the monomeric materials are then polymerized in mass until phase inversion occurs; that is, rubber-containing particles appear as distinct separate entities. Said mass polymerization or mass-type polymerization process encompasses, but is not limited to, the processes known in the art as mass, mass-suspension, and mass-solution.

For the purposes of this invention the term "emulsion polymerization process" refers to a process wherein a rubber is emulsion polymerized in an aqueous latex. After the rubber is made, monomers which are polymerizable and graftable are added to a latex containing the rubber and polymerized to form the graft portion as well as amounts of ungrafted polymer. Such processes are well-known in the art and exemplified by U.S. Pat. Nos. 3,509,238; 3,576,910; 3,644,584; 3,903,200; 4,009,226; which are incorporated herein by reference.

Each rubber component can be characterized by the volume average diameter of the particles and the process by which they are formed. The volume average diameter of emulsion polymerized particles is measured before any interpolymer is grafted onto the rubber particles. The volume average diameter of mass polymerized particles includes the interpolymer grafted to the rubber particles as well as occlusions of interpolymer within the particle.

The volume average diameter, number average diameter, and particle size distribution of the mass polymerized and emulsion polymerized rubber particles can be determined by the analysis of transmission electron micrographs of the composition containing the particles.

Conveniently, the volume average diameter, number average diameter, and particle size distribution of emulsion polymerized or mass polymerized rubber particles can be determined by electron microscopy. Hydrodynamic chromatography, as explained in U.S. Pat. No. 3,865,717, can also be used to determine the particle size of the emulsion polymerized particle.

The rubber particle components comprise particles having diameters within a fairly narrow size range. By this it is meant that the ratio of volume average particle diameter of a particle group to the number average particle diameter of the same particle group is generally in the range of from about 1 to about 3.5. In the case of large mass polymerized particles, (e.g., groups having volume average diameters greater than about $3\mu$) broader diameter size distributions (i.e., greater than 3.5) may be desirable.

One of the rubber components of the present invention comprises emulsion polymerized particles of a relatively small particle size. The particles of this component have a volume average diameter of from about 0.05 to about 0.25 microns. It is preferred that these particles have a volume average diameter of from about 0.08 to about 0.2 microns. These particles are prepared through an emulsion polymerization process. These small emulsion polymerized particles suitably represent from about 10 to about 90 weight percent of the total elastomeric material present in the claimed composition. Preferably, the small emulsion polymerized particles represent from about 20 to about 80 weight percent of the total elastomeric material present in the claimed composition.

The second of the rubber components of the present invention comprises mass polymerized particles. The mass polymerized particles have grafted thereto and occluded therein amounts of non-rubbery polymer. These particles suitably have a volume average diameter of from about 0.5 micron to about 3.0 microns (hereinafter referred to as the small mass polymerized particles). It is preferred that the small mass polymerized particles, including polymer grafted thereto or occluded therein, have a volume average diameter of from about 0.65 micron to about 1.5 microns. The elastomeric material contained in the small mass polymerized particles represents from about 5.0 to about 85 weight percent of the total elastomeric material present in the claimed composition. Preferably, the small mass polymerized particles represent from about 15 to about 75 weight percent of the total elastomeric material present in the claimed composition.

The third rubber component of the present invention also comprises mass polymerized particles. The mass polymerized particles of the third rubber component have a volume average diameter greater than the volume average diameter of the small mass polymerized particles of the second rubber component. The particles of the third rubber component preferably have a volume average diameter which is at least twice as great as the volume average diameter of the small mass polymerized particles. The larger particles of the third rubber component will hereinafter be referred to as the large mass polymerized particles. The large mass polymerized particles suitably have a volume average diameter of from about 1.0 micron to about 10 microns, preferably, from about 3.0 microns to about 8.0 microns. Compositions according to the present invention having large mass polymerized particles with a volume average diameter greater than 8.0 microns will produce good results in compositions having a total rubber content of about 10.0 percent while producing less desirable results, but still acceptable results, in compositions having a total rubber content of about 17 percent. The elastomeric material contained in the large mass polymerized particles represents from about 5.0 to about 50 weight percent of the total elastomeric material present in the claimed composition. Preferably, the large mass polymerized particles represent from about 5.0 to about 30 weight percent of the total elastomeric material present in the claimed composition.

In general, it is desirable to have from about 10 to about 85, preferably from about 30 to about 75, weight percent of the large and small mass polymerized particles consist of grafted and occluded interpolymer, the balance of the mass polymerized particles being elastomeric material.

Compositions according to the present invention exhibit surprising impact-resistance over a broader range of dart impact speeds than prior art compositions. Moreover, the claimed compositions can be adapted to provide desired gloss and impact-resistance for specific impact speeds. The desired gloss and impact resistance is achieved by variations in the relative amounts and/or the average particle sizes of the three rubber components.

The following examples are intended as illustrations only and are not to limit, in any manner, the invention set forth in the claims.

EXAMPLES

Various ASTM (American Society for Testing Materials) test methods are used to evaluate the physical properties of the following compositions. The notched Izod impact strengths (Izod) are determined in accordance with ASTM D-256. The tests are performed at 73° F.

Rheometric impact strength was determined through the use of a Rheometrics ® instrumented variable rate dart impact tester. The test method follows. A compression molded sample is clamped into a 1.5 inch diameter support ring. The sample is $2\frac{1}{4}'' \times 2\frac{1}{4}'' \times \frac{1}{8}''$. A 0.5 inch diameter dart is driven into the sample at rates between 30 inches/minute to 30,000 inches/minute. The total energy to fail is electronically determined.

The following examples of ABS compositions according to the present invention are prepared by blending together various separately prepared elements.

PREPARATION OF MASS POLYMERIZED PARTICLES OF VARIOUS SIZES

Polybutadiene was dissolved in a feed stream of styrene, acrylonitrile, and ethyl benzene to form a mixture. The mixture was polymerized in a continuous process while agitating said mixture. The polymerization occurred in a three stage reactor system over an increasing temperature profile. During the polymerization process, some of the forming interpolymer grafts to the rubber particles while some of it does not graft, but, instead, forms matrix interpolymer. The resulting polymerization product was then devolatilized, extruded, and pelletized.

Different rubber particle sizes in the final polymer product are achieved by changing certain process parameters. These process parameters and how they must be changed to produce rubber particles of a desired size are well-known in the art. These parameters include, but are not limited to degree of agitation, temperature, initiator level and type, chain transfer agents and amounts, and diluents.

PREPARATION OF SMALL EMULSION POLYMERIZED PARTICLES

A glass lined reactor was charged with water, sodium dodecylbenzene sulfonate soap, sodium bicarbonate, and ethylene diamine tetraacetic acid. The reactor was purged with nitrogen. A mixture of 7 parts by weight styrene, 3 parts by weight acrylonitrile, and 90 parts by weight butadiene; water; and sodium persulfate was added.

The reactor contents were heated to 65° C. and agitated throughout the polymerization process. Two feed streams were continuously added to the reactor over a 6 hour period. The first feed stream contained styrene, acrylonitrile, butadiene and n-octyl mercaptan. The other feed stream contained water and sodium dodecylbenzene sulfonate soap.

The polymerization was carried out in a manner which produced particles with a volume average diameter of about 0.1 micron. An interpolymer of styrene/acrylonitrile was grafted to the rubber particles produced in the process set forth above. The method of grafting to the rubber particles is well-known by those skilled in the art.

Those skilled in the art will appreciate that the amounts of reactants use in preparing both the mass polymerized and emulsion polymerized particles can be adjusted according to the amount of rubber desired in the final product.

COMPOUNDING THE BLENDS

The desired components are first tumble blended, and then fed into and compounded in a 0.8 inch twin-screw Welding Engineers compounder. The resulting compound was extruded into a strand and cut into pellets.

EXAMPLE 1

An ABS composition having a 17 percent total rubber concentration was prepared according to the present invention. The following components were compounded to form the composition:

(a) 39.7 percent of a mass polymerized particle resin with rubber particles $3.3\mu$ in diameter;
(b) 39.7 percent of a mass polymerized particle resin with rubber particles $1.5\mu$ in diameter;
(c) 17 percent of grafted emulsion polymerized particle resin with rubber particles $0.1\mu$ in diameter;
(d) 3.6 percent of a styrene/acrylonitrile copolymer (75/25) having a molecular weight of 155,000.

Of the total elastomeric material present, the large mass polymerized particles represent 25 weight percent; the small mass polymerized particles represent 25 weight percent; and the emulsion polymerized particles represent 50 weight percent.

EXAMPLE 2

An ABS composition containing 17 percent total rubber, similar to that produced in Example 1, was prepared by compounding the following components:

(a) 39.7 percent of a mass polymerized particle resin with rubber particles $8.0\mu$ in diameter;
(b) 39.7 percent of a mass polymerized particle resin with rubber particles $1.5\mu$ in diameter;
(c) 17 percent of a grafted emulsion polymerized particle resin with rubber particles $0.1\mu$ in diameter;
(d) 3.6 percent of a styrene/acrylonitrile copolymer (75/25) having a molecular weight of 155,000.

Of the total elastomeric material present, the large mass polymerized particles represent 25 weight percent; the small mass polymerized particles represent 25 weight percent; and the emulsion polymerized particles represent 50 weight percent.

EXAMPLE 3

An ABS composition containing 17 percent total rubber, similar to that produced in Example 1, was prepared by compounding the following components:

(a) 40.2 percent of a mass polymerized particle resin with rubber particles $1.35\mu$ in diameter;
(b) 40.2 percent of a mass polymerized particle resin with rubber particles $4.0\mu$ in diameter; and
(c) 19.6 percent of a grafted emulsion polymerized particle resin with rubber particles $0.1\mu$ in diameter.

Of the total elastomeric material present, the large mass polymerized particles represent 21.5 weight percent; the small mass polymerized particles represent 21.5 weight percent; and the emulsion polymerized particles represent 57 weight percent.

EXAMPLE 4

An ABS composition having 10.7 percent total rubber concentration was prepared according to the present invention. The following components were compounded to form the composition:

(a) 25 percent of a mass polymerized particle resin with rubber particles $8.0\mu$ in diameter;
(b) 25 percent of a mass polymerized particle resin with rubber particles $1.5\mu$ in diameter;
(c) 10.7 percent of a grafted emulsion polymerized particle resin with rubber particles $0.1\mu$ in diameter; and
(d) 39.3 percent of a styrene/acrylonitrile copolymer (75/25) having a molecular weight of 155,000.

Of the total elastomeric material present, the large mass polymerized particles represent 25 weight percent; the small mass polymerized particles represent 25 weight percent; and the emulsion polymerized particles represent 50 weight percent. The physical properties of the compositions of Examples 1–4 are set forth in Table I.

TABLE I

| Sample No. (Example No.) | Energy To Fail at Various Dart Speeds: | | | | |
|---|---|---|---|---|---|
| | 30 in/min. | 300 in/min. | 2,000 in/min. | ~30,000[1] in/min. | Notched Izod |
| 1 | 232 in-lbs. | 301 in-lbs. | 408 in-lbs. | 425 in-lbs. | 9.0 in-lbs. |
| 2 | 220 in-lbs. | 260 in-lbs. | 320 in-lbs. | 260 in-lbs. | 7.8 in-lbs. |
| 3 | 230 in-lbs. | 250 in-lbs. | 330 in-lbs. | 370 in-lbs. | 9.2 in-lbs. |
| 4 | 260 in-lbs. | 198 in-lbs. | 170 in-lbs. | 160 in-lbs. | *1.9 in-lbs. |

[1]Actual impact speed varied between 20,000 in/min and 30,000 in/min.

As the above results indicate, the compositions of the present invention exhibit good impact resistance over a broad range of impact speeds. Additionally, the compositions exhibit good notched Izod impact strength.

As is apparent from the foregoing specification, the present invention is susceptible of being embodied with various changes and modifications to achieve various desired characteristics in the final compositions. For this reason it is to be understood that all of the foregoing is intended to be merely illustrative and is not to limit or restrict, in any way, the scope of the present invention.

What is claimed is:

1. An improved rubber-modified, impact resistant polymeric composition comprising:
   (a) a matrix comprising an interpolymer, said interpolymer being polymerized from a monovinylidene aromatic monomer and an ethylenically unsaturated nitrile monomer; and
   (b) dispersed in said matrix, in the form of discrete particles, from about 6 to about 40 weight percent, based on total polymeric composition weight, of elastomeric material wherein the improvement consists of the dispersed elastomeric material comprising the following three different grafted rubber components:
      (1) a component of small, emulsion polymerized particles, being from about 10 to about 90 weight percent of the total elastomeric material and having a volume average diameter from about 0.05 micron to about 0.25 micron;
      (2) a component of small, mass polymerized particles, being from about 5 to about 85 weight percent of the total elastomeric material, and having a volume average diameter from about 0.5 micron to about 3.0 microns; and
      (3) a component of large, mass polymerized particles, being from about 5.0 to about 50 weight percent of the total elastomeric material, and having a volume average diameter which is at least two times greater than the volume average diameter of the small mass polymerized particle, said volume average diameter of the large mass polymerized particle being from about 1.0 micron to about 10 microns.

2. A polymeric composition according to claim 1 wherein grafted rubber component (1) has a volume average diameter of from about 0.08 micron to about 0.2 micron and is from about 20 to about 80 percent by weight of the total elastomeric material; grafted rubber component (2) has a volume average diameter of 0.65 micron to about 1.5 microns and is from about 15 to about 75 weight percent of the total elastomeric material; and grafted rubber component (3) has a volume average diameter of from about 3.0 microns to about 8.0 microns and is from about 5 to about 30 weight percent of the total elastomeric material.

3. The polymeric composition according to claim 1 wherein the interpolymer of the matrix comprises at least one about 70 percent by weight of the total composition, the interpolymer comprising an ethylenically unsaturated nitrile monomer in an amount of from about 10 to about 40 weight percent and monovinylidene aromatic monomer in an amount of from about 90 to about 60 weight percent based on total interpolymer weight.

4. The polymeric composition of claim 3 wherein the monovinylidene aromatic monomer is styrene and the ethylenically unsaturated nitrile monomer is acrylonitrile.

5. The polymeric composition of claim 1 wherein the interpolymer of the matrix comprises styrene, acrylonitrile, and methyl methacrylate.

6. A polymeric composition according to claim 1 wherein grafted rubber component (1) has a volume average diameter of from about 0.08 micron to about 0.2 micron and is from about 20 to about 80 weight percent of the total elastomeric material; grafted rubber component (2) has a volume average diameter of from about 0.65 micron to about 1.5 microns and is from about 15 to about 75 weight percent of the total elastomeric material; and grafted rubber component (3) has a volume average diameter of from about 3.0 microns to about 8.0 microns and is from about 5 to about 30 weight percent of the total elastomeric material.

7. The polymeric composition according to claim 1 wherein the interpolymer of the matrix comprises at least about 30 percent by weight of the total composition, the interpolymer comprising an ethylenically unsaturated nitrile monomer in an amount of from about 10 to about 40 weight percent and a monovinylidene aromatic monomer in an amount of from about 90 to about 60 weight percent based on total interpolymer weight.

8. The polymer composition of claim 7 wherein the monovinylidene aromatic monomer is styrene and the ethylenically unsaturated nitrile monomer is acrylonitrile.

9. The polymeric composition of claim 1 wherein the interpolymer of the matrix comprises styrene, acrylonitrile, and methyl methacrylate.

10. A polymeric composition according to claim 1 wherein grafted rubber component (3) has a volume average diameter of from about 3.0 microns to about 10 microns.

* * * * *